United States Patent
Grandclèment

[11] 4,455,482
[45] Jun. 19, 1984

[54] HEATING ASSEMBLY FOR HEATING AN AREA OF A THERMOPLASTIC PIPE

[75] Inventor: Gérard Grandclèment, Cap d'Ail, France

[73] Assignee: Innovation Technique, France

[21] Appl. No.: 393,783

[22] Filed: Jun. 30, 1982

[30] Foreign Application Priority Data

Jul. 1, 1981 [MC] Monaco ................................. 1526
Sep. 29, 1981 [MC] Monaco ............................. 1548

[51] Int. Cl.³ .......................................... H05B 3/02
[52] U.S. Cl. .............................. 219/551; 156/380.5;
156/274.2; 156/379.7; 219/535; 219/541;
219/544; 264/27; 264/272.11; 338/291; 285/21
[58] Field of Search ............... 219/528, 535, 541, 544,
219/551; 338/293, 297, 310; 156/274.2, 86,
275.1, 380.5, 293, 379.7, 304.2, 304.6; 425/143,
144; 285/21, 286, 292, 417; 264/27, 272.11, 275,
332

[56] References Cited

U.S. PATENT DOCUMENTS

2,182,319 12/1939 Owen .......................... 219/551 X
3,987,276 10/1976 Vogelsanger et al. ............. 219/535
4,117,311 9/1978 Sturm ................................ 219/544

FOREIGN PATENT DOCUMENTS

197141 4/1958 Austria ............................... 219/551

Primary Examiner—Volodymyr Y. Mayewsky
Attorney, Agent, or Firm—Frishauf, Holtz, Goodman & Woodward

[57] ABSTRACT

Device of thermoplastic material for making a perforation in an underlying element made of a plastics material compatible with the first-mentioned plastics material.

It is composed of a plate (1) of relatively slight thickness, in one face (2) of which a spiral groove (3) is formed, at the center of which the plate is provided with an opening (1'), the said spiral groove being intended to receive an electric heating wire (19) of which one end is intended to be attached to a first projection (7) carried by the plate, on the side of the face in which the said groove is formed, while its other end is intended to be attached to a second projection (10) similar to the first and situated a certain distance from the latter.

Application to the making of branch pipes.

12 Claims, 13 Drawing Figures

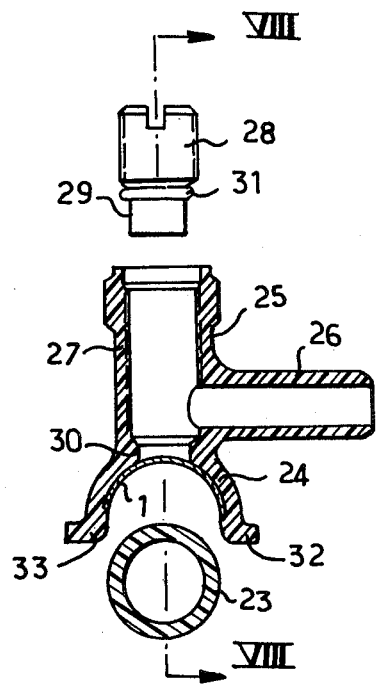
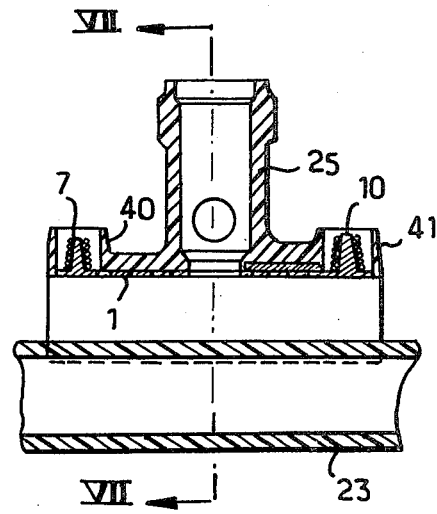
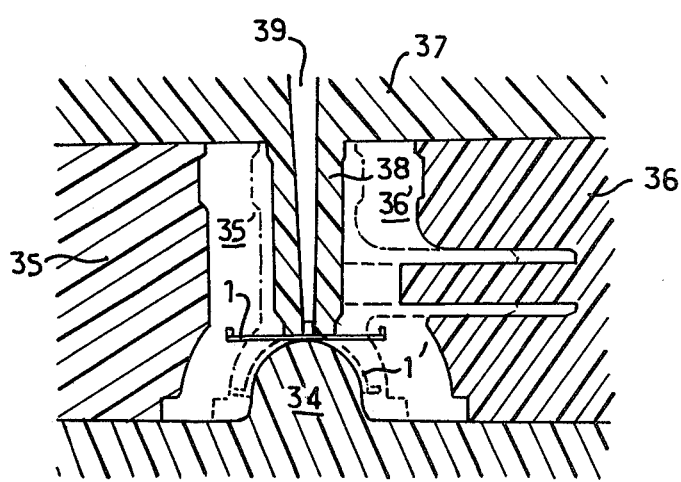
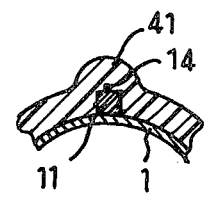
FIG.7
FIG.8
FIG.9
FIG.10

HEATING ASSEMBLY FOR HEATING AN AREA OF A THERMOPLASTIC PIPE

The present invention relates to a device of plastics material, preferably thermoplastic material, for making a perforation in an underlying element of a plastics material similar to or compatible with the first-mentioned plastics material, and also to a process for the production of a device of this kind and its utilisation for making branch pipe connections.

Although the device according to the invention can be used for making a perforation in any underlying element, its main application is that of making, on site, a branch connection on a main pipe consisting of piping of plastics material, particularly thermoplastic material.

Generally speaking, a branch connection of this kind is made by perforating the main pipe after the connection has been placed in position, this perforation being made possible by heating the main pipe of thermoplastic material in the zone where the perforation is to be made, while the heating is effected by means of a heating electric resistor.

When it is required to join a branch pipe to the main pipe, the heating resistor is, in one known device commonly used, enclosed in the saddle of the branch connection, this saddle being placed over the main pipe at the site where the connection is to be made, in such a manner as to heat the part of the saddle and of the main pipe in the zone where the perforation is required, while the heating must at the same time effect the leaktight welding between the branch saddle and the main pipe.

In order to achieve heating in this manner, one known means consists in spirally winding around itself an electric heating wire previously covered by an insulating sheath, then burying this spiral in the generally circular face of the saddle, which is intended to be applied against the outer face of the main pipe. However, the manufacture of this spiral of insulated electric wire, on the one hand, and its enclosure in the saddle, on the other hand, are difficult and expensive operations which do not easily lend themselves to large scale production, particularly if it is desired to achieve a good quality for the parts used for the branch pipe connection.

Moreover, one end of the wire spiral which has to be connected to a supply voltage source for heating purposes is situated inside the smallest turn of the spiral, and its connection to the voltage source must be made from the interior of the tubular branch connection, thus complicating the operation because it is precisely at that point that intervention is necessary in order to pierce the main pipe.

According to another known proposal, use is made of a rectangular mat of sheathed wire fixed inside the branch connection and held captive between the latter and the main pipe, on the periphery of the main pipe. The sheathed wire is heated by the heat of an electric current, whereas the branch connection is applied against the main pipe with the aid of a clamp in order to achieve an adequate application force for the assembly, the main pipe being pierced as soon as its wall reaches a sufficient degree of viscosity.

In the application of this technique considerable electric power is required to make the weld, because heating is effected over the entire periphery of the main pipe, so that in addition there is a risk that the latter will burst because of the necessary softening of the plastics material of which it is made. Finally, during the piercing of the main pipe it is necessary to cut a certain number of wires in the rectangular mat, thus complicating the piercing operation and possibly leading to microleakage along the separating surface between the heating wire and its sheath.

In order to overcome the shortcomings mentioned above, the present invention has as its object a device of plastics material, particularly of thermoplastic material, for making a perforation in an underlying element made of the same material or of a plastics material compatible with the first-mentioned plastics material, which device is essentially characterised in that it is composed of a plate of relatively slight thickness, in one face of which a spiral groove is formed, the plate being provided with an opening at the centre of the spiral and the spiral groove being intended to receive an electric heating wire, one end of which is intended to be attached to a first projection carried by the plate on the side of the face in which the said groove is formed, while the other end is intended to be attached to a second projection similar to the first and situated a certain distance from the latter.

A first embodiment of a device of this kind is advantageously characterised by the fact that the plate is substantially circular and is provided with two lugs carrying the projections, while the outer turn of the spiral groove leads out to the periphery of the plate at a point corresponding to the position of the first said projection and, in a position corresponding to that of the lug carrying the second projection, the plate is provided with a tongue adapted to be folded over onto the grooved face of the plate in such a manner that at least one part of it assumes a radial position and serves as an insulating support for the end of the wire passing out from the inner turn of the groove and intended to be attached to the second projection.

In another embodiment the device is characterised by the fact that at the peripheral entry of the groove the plate is provided with at least one guide stud for the wire attached to the first projection, and/or studs are provided on the upper face of the folded-over tongue in order to guide the wire attached to the second projection.

Other embodiments are characterised in that:

(a) The tongue is provided, near the periphery of the plate, with a thinner portion forming a hinge;

(b) Between the two projections the periphery of the plate is provided with at least one positioning nipple;

(c) Each projection has a conical base joined to the grooved face of the plate and ends in a cylindrical portion;

(d) The lateral sides of the turns of the spiral groove are inclined in the direction of the centre of the plate;

(e) The entry of the spiral turns is narrower than the diameter of the heating wire, at least over certain lengths of the turns.

The invention also relates to a process for placing the heating wire in position in the spiral groove of the device defined above, and this process is characterised in that the heating wire, coming from a dispensing reel, is attached to the first said projection and is placed around the neighbouring stud, that a multi-branch cross piece extending between the two projections is placed in a central position on the plate, that the plate is turned under the cross piece until the spiral is completely filled, that the tongue is folded over onto the plate, and that after the wire coming from the reel has been parted the end of the wire is fastened on the second projection by passing it over or between the studs carried by the said tongue.

After the different operational phases of this process have been carried out, the openings of the groove are advantageously deformed by the application of a heated tool, thus imprisoning the heating wire in the groove.

Finally, the present invention also relates to the utilisation of a device of the kind defined above, for the purpose of fastening the saddle of a branch connection on a pipe connection or a main pipe of plastics material, this utilisation being characterised by the fact that the said device is incorporated, in an arched or curved shape, in the face of the saddle intended to come to bear against the pipe connection or main pipe, preferably during the moulding of the saddle, and that during the heating of the wire the device is firmly held against the said pipe by stirrups attached to lugs on the saddle, or by the engagement of these lugs in a half-collar provided with grooves comprising inclined clamping slopes or effecting clamping by the elastic deformation of the half-collar and/or of the saddle.

One embodiment of the invention, together with modifications, is described below by way of example and illustrated in the accompanying drawings.

FIG. 7 is a diagrammatical section along the line VII-VIII in FIG. 8 of a branch connection for a main pipe, incorporating the device according to the invention;

FIG. 8 is a section along the line VIII—VIII in FIG. 7;

FIG. 9 shows diagrammatically an injection mould for incorporating the device according to the invention in a saddle;

FIG. 10 is a view of a detail, showing a heating wire outlet;

Figure 1:
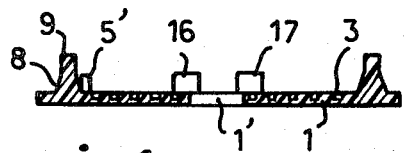
FIG. 1 is a diametrical section of the device according to the invention.
Figure 2:
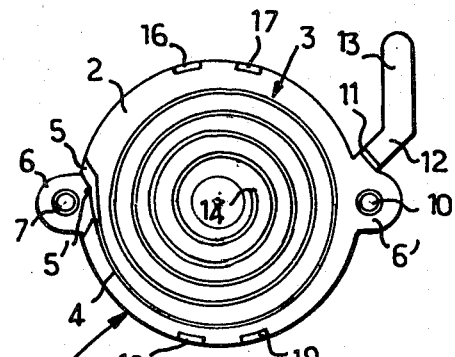
FIG. 2 is a plan view of the device shown in FIG. 1, on its face provided with the spiral groove.

As can be seen in FIGS. 1 and 2, the device according to the invention is composed of a thin, substantially round plate 1 of moulded plastics material. In the upper face 2 of this plate 1 a groove is provided, which is given the general reference 3 and which is formed directly during the moulding of the plate 1; this groove can be freed from the mould by simply rotating the plate in its own plane, which is made possible by the fact that the outer turn 4 leads out to the periphery of the plate, preferably in the form of a widened groove 5 at the mouth of which a stud 5' is provided. At the site of the widened groove the plate 1 is extended by a first lug 6, with which is integrally moulded a first projection 7 having a substantially frustoconical base 8 and a cylindrical apex 9. Diametrically opposite the lug 6, the plate 1 is provided with a second projection 10 which is identical to the first projection 7 and lies on a second lug 6'. A bent tongue 12 is attached by a thinner portion 11, forming a hinge, to the second projection 10, the portion 13 of which tongue assumes a radial position which is substantially in alignment with the projections 7 and 10 and with the end 14 of the inner turn of the groove 3. On the rear face of its portion 13, not visible in FIG. 2 but visible in FIG. 5, this tongue is provided with two rows of studs 15, 15'. Finally, the plate 1 is provided with four peripheral positioning nipples 16, 17, 18, 19, the object of which will be explained later on, and it should be noted that the depth of the groove 3 is such that the bare heating wire which is to be received in the groove is situated as close as possible to the opposite face of the plate to that in which this groove is formed.

Figure 3:
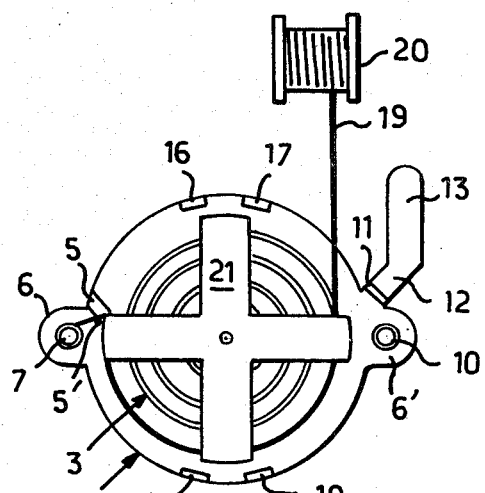
FIG. 3 is a plan view of the device according to the invention, showing the method of placing the heating wire in position in the spiral groove.
Figure 5:
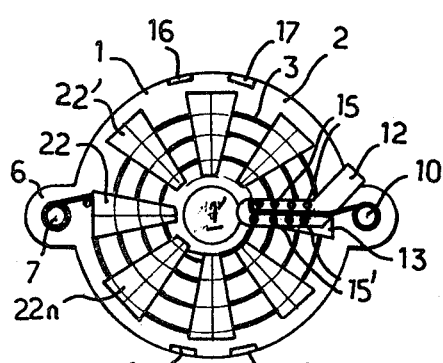
FIG. 5 is a plan view of the device according to the invention with the placing in position of heated tools in order to deform the lips of the spiral groove, for the purpose of imprisoning the heating wire.
Figure 4:
FIG. 4 is a view of a detail showing the formation of a connection terminal for the device according to the invention.

In order to place the bare heating wire in position in the groove 3, the procedure is as follows: the heating wire 59 (FIG. 3) is taken from the dispensing reel 20. Its free end is first wound over the projection 7, as indicated in FIG. 4, and then the wire is passed around the stud 5', thereby positioning the wire at the entry of the spiral groove 3. A cross piece 21 having four arms is then placed in a central position on the plate 1, in such a manner that it bears against the plate, and the latter is turned in the clockwise direction, thus causing the wire to unwind from the reel 20 and progressively to take up position in the turns or furrows of the spiral. When the wire has filled the groove 3 as far as the end 14 of the inner turn of the spiral, the cross piece 21 is removed, care being taken to prevent the wire from coming out of the spiral, and the bent lever 12,13 is folded over, around the thinner portion 11 forming a hinge, onto the plate 1, in such a manner that the portion 13 assumes a radial position substantially in alignment with the projections 7 and 10, as can be seen in FIG. 5. The wire 19 is then passed between the two rows of studs 15 and 15', and its end is wound over the projection 10 in the manner shown in FIG. 4.

Figure 6:
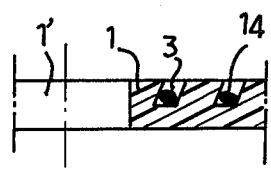
FIG. 6 is a partial diametrical section of the device according to the invention, showing one particular shape of the radial section of the groove.

In order to prevent the wire from passing out of the groove after the cross piece 21 has been removed, a heated tool may be applied to the face of the plate 1 which is provided with the groove containing the heating wire, this tool having a plurality of trapezoidal punches 22, 22', 22" . . . 22n taking up position between the arms of the cross piece 21 and crushing the edges or lips of the groove; however, as shown in FIG. 6, it is also possible to provide the groove with side walls inclined downwards and towards the centre of the plate, thus automatically preventing the wire, which is laid under tension in the groove, from passing out; alternatively, the lips of the groove may be spaced apart a distance less than the diameter of the wire, so that the latter is in a manner of speaking clipped in the groove.

FIG. 7 shows the utilisation of the device according to the invention for the purpose of making, on site, a branch connection on a main pipe represented by the pipe 23, on which it is required to fasten the branch connection comprising a saddle 24, which is rounded to match the external curvature of the pipe and surmounted by a tubular chimney 25, into one side of which the branch pipe 26 leads.

A perforator 28 is adapted to be screwed into the internal screwthread 27 of the chimney, the bottom tail 29 of this perforator being adapted to pass through the bottom hole 30 in the chimney in order to pierce the wall of the pipe 23, which will previously have been brought to its melting point as will be described later on, after which, and after solidification of the pipe wall, the perforator 28 together with its sealing packing 31 is raised above the branch pipe 26 and removed.

In order to heat and melt the plastics material of which the pipe 23 is made, at the point where the branch connection is required, use is made of the device according to the invention, as described with reference to FIGS. 1 to 6. The plate 1, equipped with the heating wire, is placed under the saddle 24 and the latter is held pressed against the pipe with the aid of a clamping collar acting on the saddle at its two lugs 32 and 33. The two terminals 7 and 10 of the plate 1 are then connected until the corresponding part of the pipe 23 is melted or softened; after solidification of the pipe 23 in the part corresponding to the plate 1, the perforator 28 is driven into the chimney so that its tail 29 passes through the pipe wall, and the perforator 28 is freed from the branch pipe 26. The perforation is thus effected and sealing is achieved through the at least superficial fusion of the plate 1 to the pipe wall, while a cap 28' is screwed onto the branch connection chimney after an O-ring 31' has been placed in position.

However, the heating plate 1 of the type described in connection with FIGS. 1 to 6, is advantageously incorporated in the branch connection saddle during the moulding of the latter, in the manner illustrated in FIG. 9.

The plate 1 is placed in the open mould, on a fixed boss 34 curved to match the profile of the saddle which is to be formed, while the slides 35 and 36 are in their retracted position with the mould open. The plate 1 is then locked at its centre through the lowering of the upper part 37 of the mould, which carries a projection 38 constituting the core for the chimney cavity 25 and provided with an injection runner 39. The side slides 35 and 36 are then closed and assume the positions 35' and 36', bending the plate as indicated at 1'. The thermoplastic material is injected into the mould closed in this manner, in order to produce the branch connection incorporating the plate 1. The terminals 7 and 10 of the plate 1 will preferably at the same time be surrounded by small protective chimneys 40 and 40' integrally moulded with the branch connection, and during this same moulding operation an increased thickness 41 (FIG. 10) will be given to the part 13 of the tongue which is folded over onto the plate 1, as shown in FIG. 5, in order to protect the wire which passes between the studs 15 and 15' before being wound over the projection 10.

Figure 12:
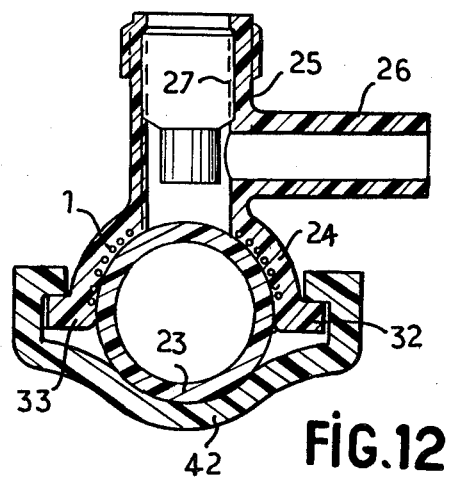
FIG. 12 is a median cross-section of FIG. 11, in the assembled state, with the device according to the invention, which was not shown in FIG. 11 for the sake of clarity.
Figure 11:
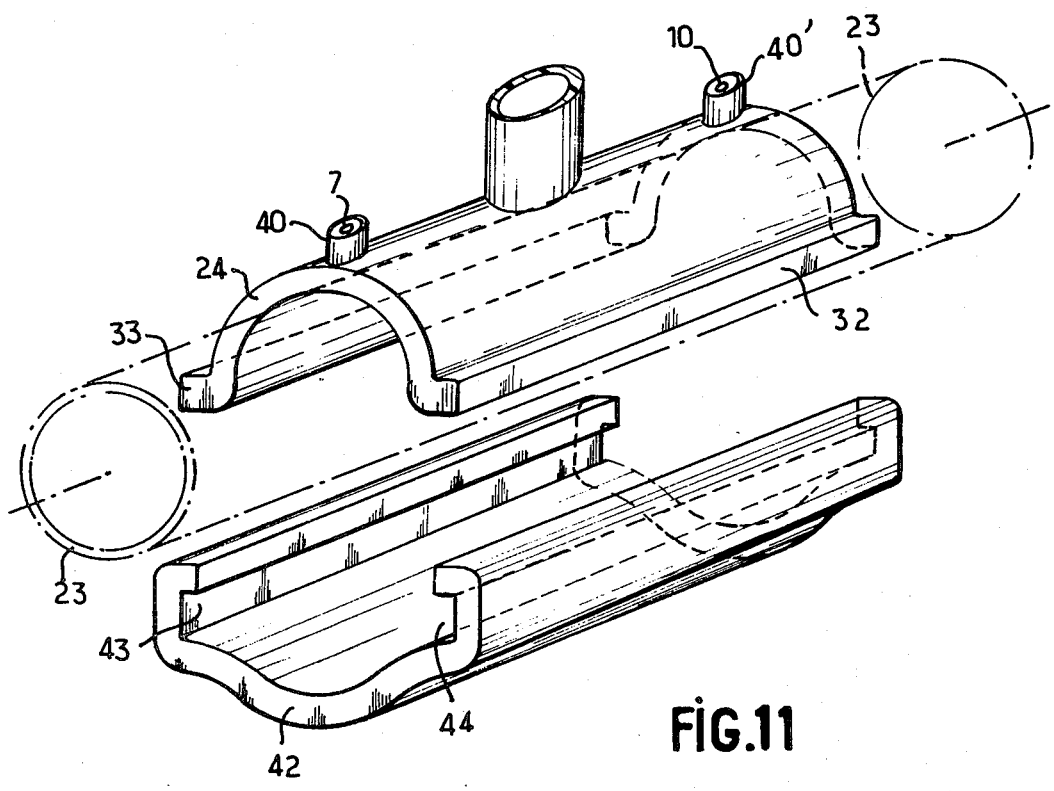
FIG. 11 is an exploded view in perspective of the saddle and clamping half-collar.

FIGS. 11 and 12 show a modification of the construction of a branch connection on a main pipe, utilising a plate according to the invention, this plate not being shown in FIG. 11 for the sake of clarity, but being visible in FIG. 12, which is a median cross-section of the branch connection shown in FIG. 11, elements corresponding to those in the other figures being here given the same references.

In order to clamp the saddle 24, in which the plate 1 according to the invention, containing the bare heating wire, is incorporated and in which the terminals 7 and 10 of the plate are protected by the chimneys 40 and 40', use is made of a half-collar 42 of plastics material, which is composed of a cylindrical median portion at the ends of which U-shaped grooves 43 and 44 are formed, whose height decreases from one end to the other and in which are engaged the lugs 32 and 33 of the saddle, thus effecting the clamping of the saddle on the pipe 23 and the firm application of the plate 1 against the outside wall of the pipe 23 in order to obtain a good weld.

In a modified embodiment the U-shaped grooves have a constant height, but the lugs 32 and 33 are inclined relative to the axis of the pipe, while of course the inverse arrangement would give the same result.

Figure 13:
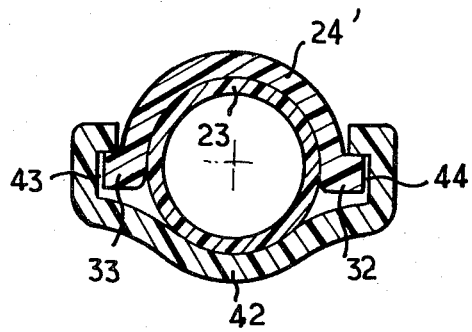
FIG. 13 is a diagrammatical sectional view of a clamping collar.

Finally, in yet another modified embodiment the clamping is obtained simply by adopting, for a given pipe diameter, dimensions of the radii of curvature of the half-collar such that the resilient deformation of the material applies to the lugs 32 and 33 forces which tend to bring them closer together, as is also the case in the embodiment shown in FIG. 13, in which the half-collar 42 is associated with a simple saddle 24' without a branch connection.

It is to be understood that the examples described above constitute only preferred embodiments of the invention, and that the latter includes all variants thereof.

I claim:

1. A piece-part for an assembly for heating an area of a thermoplastic pipe for providing a perforation therethrough for a junction thereto, said piece-part being constituted as a thin, flexible plate of thermoplastic material integrally molded in a unit having:
   a central perforation (1');
   a spiral groove (3) in one face of said plate of a size for receiving an electrical heater wire conductor snugly therein, said groove terminating at one end in the central portion of said plate at a location spaced from the edge of said perforation and terminating at its other near the periphery of said plate; and
   a pair of projections (7,10) at the periphery of said plate diametrically opposite each other with respect to said perforation, extending substantially perpendicularly to said plate, and of a configuration suitable for accomodating wire-wrapped terminal portions of said wire conductor.

2. Heating assembly piece-part according to claim 1, wherein said plate is substantially circular in contour and has a first (6) and a second (6') outwardly extending lug on which respectively a first (7) and the second (10) of said projections are based, a channel being provided leading from the outermost turn of said spiral groove (3) to the periphery of said plate at a place adjacent to said first lug (6) and a tongue (13) being provided adjacent to said second lug (6') and to the periphery of said plate, which tongue is of a configuration suitable for being folded over against the grooved face of said plate in such a manner that at least a part thereof extends radially across the turns of said groove, whereby the holding in place and the insulation of an end portion of an electrical conductor extending from the innermost turn of said spiral groove to a wire-wrapped connection on said second projection (10) may be facilitated after all but the end portions of said conductor shall have been placed in said spiral groove.

3. Heating assembly piece-part according to claim 2, wherein the portion of said tongue (13) which is adjacent to the periphery of said plate and to said second lug includes a strip (11) which is thinner than the remainder of said tongue, whereby a hinge for said tongue is formed there.

4. Heating assembly piece-part according to claim 2, in which at least one nipple (16) extending away from the face of said plate in which said spiral groove provided, is located intermediate of said lugs for facilitating the positioning of said plate in a heating assembly.

5. Heating assembly piece-part according to claim 1, wherein said first and second projections (7,10) each have a base that tapers upward and end in a portion of substantially constant cross-section.

6. Heating assembly piece-part according to claim 2, in which the lateral walls of the turns of said spiral groove (3) are inclined, in the direction of groove depth, towards the said central perforation (1') of said plate.

7. Heating element for heating an area of a thermoplastic pipe for providing a perforation therethrough for a junction thereto, comprising:
a thin, flexible plate of thermoplastic material having a central perforation (1') therein, a spiral groove (3) in one face thereof, said groove terminating at one end in the central portion of said plate at a location spaced from the edge of said perforation and terminating at its other end near the periphery of said plate, and a pair of projections molded integrally with said plate at the periphery of said plate and diametrically opposite each other with respect to said perforation, extending substantially perpendicular to said plate, and
an electrical heating wire laid in said spiral groove and having its end respectively wrapped on said projections (7,10), said plate having means molded integrally therewith and interposed on top of said grooves bearing said wire therein and beneath the end portion of said conductor which proceeds from the innermost turn of said spiral groove to one of said projections for insulation of said last mentioned end portion of said conductor.

8. A heater assembly according to claim 7, in which said turns of said spiral groove each have at least a portion in which the lips of said groove are so spaced that in their rest position, in absence of said wire conductor therein, they would be spaced apart by less than the diameter of said wire conductor.

9. Heating assembly piece part according to claim 1, having an electrical wire (19) laid in said spiral groove (3) and having its ends respectively wrapped on said projections (7,10), said flexible plate having at least one pair of studs (15,15') through which passes the end of said wire (19) passing from the radially inner end of said spiral groove (3) to one (10) of said projections (7,10).

10. Heating assembly piece part according to claim 9, in which there are a plurality of pairs of studs (15,15') through which said wire end passes in succession in passing from said inner end of said spiral groove (5) to said one (10) of said projections (7,10).

11. Heating assembly piece part according to claim 9, in which said studs (15,15') are formed on a tongue (13) which is integral with said flexible plate, connected to said plate in the region of its periphery and folded over on said plate so as to cover at least the portions of said spiral groove (3) located beneath said wire end which passes from said inner end of said spiral groove (5) to said one of said projections (7,10).

12. Heating assembly piece part according to claim 10, in which said studs (15,15') are formed on a tongue (13) which is ingetral with said flexible plate, connected to said plate in the region of its periphery and folded over on said plate so as to cover at least the portions of said spiral groove (3) located beneath said wire end which passes from said inner end of said spiral groove (5) to said one of said projections (7,10).

* * * * *